(12) United States Patent
Salmon

(10) Patent No.: US 11,293,472 B2
(45) Date of Patent: Apr. 5, 2022

(54) BAYONET-TYPE LOCKING AND UNLOCKING SYSTEM FOR CIRCULAR CONNECTOR WITH AUDIBLE INDICATOR

(71) Applicant: SOURIAU, Versailles (FR)

(72) Inventor: Xavier Salmon, Change (FR)

(73) Assignee: SOURIAU, Versailles (FR)

( * ) Notice: Subject to any disclaimer, the term of this patent is extended or adjusted under 35 U.S.C. 154(b) by 276 days.

(21) Appl. No.: 16/623,606

(22) PCT Filed: Jun. 26, 2018

(86) PCT No.: PCT/FR2018/051542
§ 371 (c)(1),
(2) Date: Dec. 17, 2019

(87) PCT Pub. No.: WO2019/002741
PCT Pub. Date: Jan. 3, 2019

(65) Prior Publication Data
US 2021/0140460 A1 May 13, 2021

(30) Foreign Application Priority Data

Jun. 26, 2017 (FR) ...................................... 1755845

(51) Int. Cl.
*F16B 21/04* (2006.01)
*F16B 7/20* (2006.01)

(52) U.S. Cl.
CPC ............... *F16B 21/04* (2013.01); *F16B 7/20* (2013.01)

(58) Field of Classification Search
CPC ........ F16B 21/04; F16B 7/20; Y10T 403/7007; F16L 37/107; F16L 37/248
See application file for complete search history.

(56) References Cited

U.S. PATENT DOCUMENTS

| 2,444,758 | A | * | 7/1948 | Stillbach | ................. | A47L 13/24 |
| | | | | | | 15/145 |
| 5,253,716 | A | * | 10/1993 | Mitchell | ................ | A62C 31/22 |
| | | | | | | 169/70 |
| 7,104,826 | B2 | * | 9/2006 | Zahlit | ................. | H01R 13/625 |
| | | | | | | 439/314 |
| 9,366,315 | B2 | * | 6/2016 | Tylaska | ................... | F16G 11/10 |

FOREIGN PATENT DOCUMENTS

| DE | 10 2015 013881 A1 | 4/2016 |
| EP | 1 862 719 A1 | 12/2007 |
| FR | 2 808 570 A1 | 11/2001 |

OTHER PUBLICATIONS

International Search Report of International Application PCT/FR2018/051542 dated Oct. 1, 2018.

* cited by examiner

*Primary Examiner* — Daniel J Wiley
(74) *Attorney, Agent, or Firm* — Perman & Green, LLP

(57) ABSTRACT

A bayonet-type locking and unlocking system for a circular connector with audible indicator of locking, including: a socket including at least one unlocking ramp, a locking ring including at least one locking ramp in which the lug of the socket slides in translation, a locking piece including a blocking tooth, an unblocking lug, and a guideway, the system including a locking position in which the blocking tooth is positioned in the guide slot blocking the position of the lug of the socket in the circular part of the locking ramp.

8 Claims, 2 Drawing Sheets

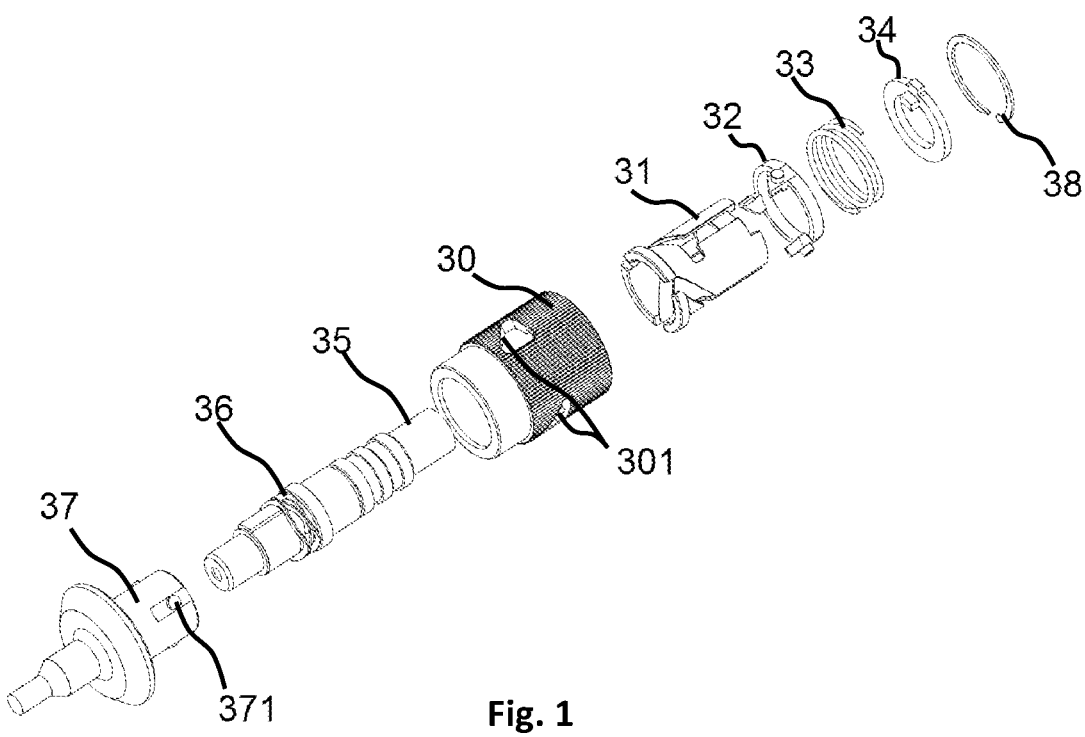
Fig. 1
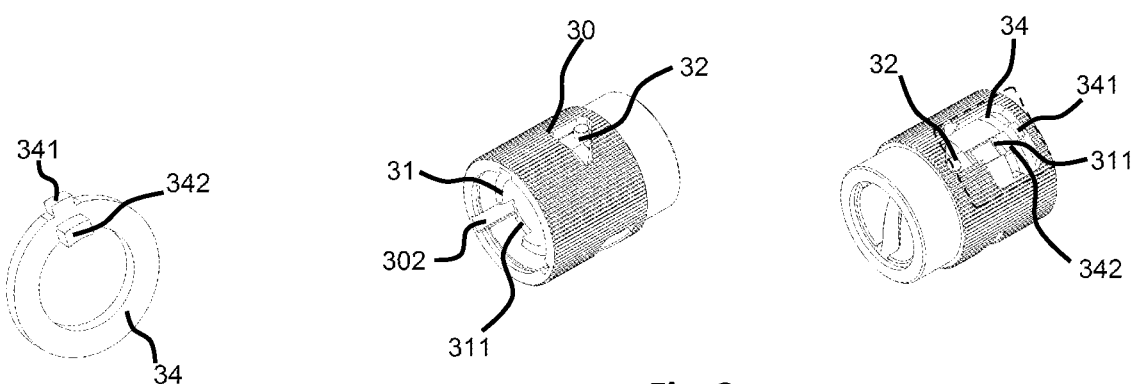
Fig. 2
Fig. 3
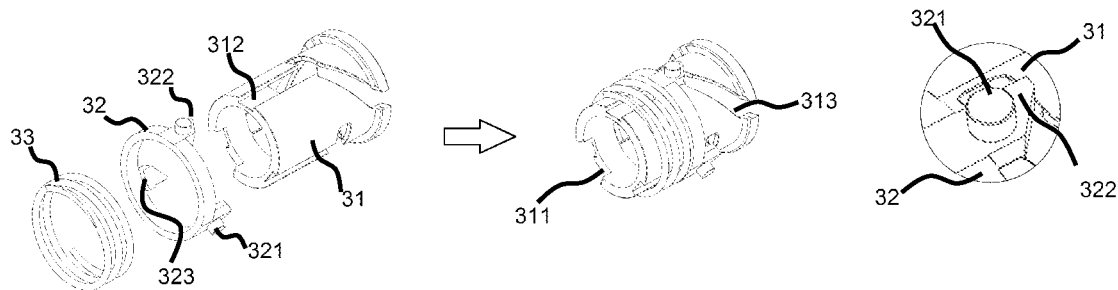
Fig. 4

BAYONET-TYPE LOCKING AND UNLOCKING SYSTEM FOR CIRCULAR CONNECTOR WITH AUDIBLE INDICATOR

CROSS REFERENCE TO RELATED APPLICATIONS

This application is a National Stage of International Application No. PCT/FR2018/051542, having an International Filing Date of 26 Jun. 2018, which designated the United States of America, and which International Application was published under PCT Article 21(2) as WO Publication No. 2019/002741, which claims priority from and the benefit of French Patent Application No. 1755845, filed on 26 Jun. 2017, the disclosures of which are incorporated herein by reference in their entireties.

BACKGROUND

1. Field

The present disclosure relates to a bayonet-type locking and unlocking system for a circular connector with audible indicator of locking.

The disclosure relates to a locking system that makes it possible to block the system in the locked position regardless of the vibrations and/or impacts of the external environment.

The disclosure has applications in all fields that require the locking of a connector onto another element. It has in particular applications in the field of connectivity and, in particular, in the fields of connectivity in harsh environments such as aeronautics, space, automobile, railroad and industrial equipment wherein the connectors are often subjected to strong vibrations in their environments.

The disclosure has applications in the fields of connectivity in particular in dark or difficult-to-access environments wherein it is inconvenient to view the complete locking and wherein the unlocking has to be able to be carried out easily via a simple rotation and without complex handling of one single element.

The disclosure has applications in fields of connectivity that use contacts with a very short operating stroke.

The disclosure also has applications in the fields of connectivity that require an absence of mobility of the plug in relation to the socket during the blocking of the locking and during traction on the cabling.

2. Brief Description of Related Developments

The term bayonet-type locking and unlocking system for a circular connector refers to a set comprised of at least one lug fixed onto one of the connectors, of at least one locking ramp arranged on the other connector and an elastic system.

This system makes it possible, by limited angular rotation, to join the two connectors and maintain them in position. The blocking in the locked position is provided by a hollow machining arranged in the locking ramp which imprisons the lug and makes disconnection difficult.

In certain applications, in particular in the fields of aeronautical or automobile connectivity, the strong environmental vibrations generate displacements of the connection elements in relation to one another. These displacements can result in the loss of the signal between the contacts of the socket and those of the plug.

In order to prevent any displacement of the socket in relation to the plug body, it is known to provide each connection with a bayonet-type locking and unlocking system that makes it possible to lock the connection between the two connection elements and thus prevent untimely disconnections. Such a locking system must make it possible to maintain the connection, even when the connector assembly is subjected to vibrations.

The bayonet-type locking and unlocking systems have as a disadvantage requiring an operating set and an elastic system in order to allow for the displacement of the connectors between them during the locking and the unlocking and also to allow for maintaining them in pressure together after complete locking.

This operating principle is not acceptable in the case of the use of contacts with a very short operating stroke.

It is known that bayonet-type locking and unlocking systems have as a disadvantage generating either a recoil of one of the connectors during the passage of the lug in the hollow of the locking ramp, or of allowing the displacement of one of the connectors in case of traction on the cabling according to the positioning of the elastic system.

It is known that bayonet-type locking and unlocking systems have as a disadvantage of not making perceptible the end of locking in the case where a strong locking torque is required. This lack of perception must then be compensated by an environment that makes it possible then to view the complete locking. It is known that the connectors used in harsh environments generally satisfy standards that define the profile of the locking ramps of the connectors.

SUMMARY

The present disclosure aims to overcome these disadvantages.

To this effect, the present disclosure relates to a bayonet-type locking and unlocking system for a circular connector with audible indicator of locking which comprises:

a socket comprising at least one lug;

a plug body that is inserted into the socket;

an external ring comprising an axial slot on the lower wall of the external ring in which is inserted an intermediate washer driving the rotation thereof, said external ring comprises at least one unblocking ramp of which the slope is suitable for cooperating in the unlocking phase with an unblocking lug of a locking piece;

a locking ring comprising at least one locking ramp in which a lug of the socket slides in translation, said locking ramp is comprised of three parts, an axial part, a helical part and a circular part;

the lug of the socket slides successively during the locking in the axial part, the helical part and the circular part of the locking ramp;

a locking piece comprising at least one blocking tooth, at least one unblocking lug and at least one guideway; said locking piece is mobile in axial translation with respect to the locking ring by the intermediary of the guideway and of a guide slot, the unblocking lug of the locking piece is suitable for cooperating with the unblocking ramp of the external ring in the unlocking phase only;

said system comprises an unlocking position wherein the blocking tooth of the locking piece is positioned in the guide slot leaving the lug of the socket free to translate to the helical part of the locking ramp;

said system comprises a locking position wherein the blocking tooth of the locking piece is positioned in the guide slot blocking the position of the lug of the socket in the circular part of the locking ramp;

an intermediate washer inserted into the external ring; said intermediate washer has a peripheral key linked in rotation by the axial slot of the external ring; said intermediate washer also has a side key linked in rotation by the housing of the locking ring in the locking phase.

This type of locking can only be unlocked by human intervention and by a simple rotation of an external ring, without a combined movement and without manipulation of another element.

The implementation therefore makes it possible to be carried out in a dark or difficult-to-access place. The end of the locking is audible regardless of the locking torque to be applied so that the users know that the connection is completely carried out.

This type of locking gives a precise connection system that does not generate any movement during the blocking of the locking or in the case of traction on the cable. The systems allows for a use of contacts with a small operating range (<0.50 mm).

Thus, the socket and the plug body are blocked by the locking piece.

There is no displacement of the plug and of the socket in relation to one another in the blocking or unblocking phase.

The blocking tooth of the locking piece forms an anti-unlocking system.

The lug of the socket is blocked in the circular part of the locking ramp and is released only in the unlocking phase by the setting into rotation of the external ring that drives the locking ring by the intermediary of the locking piece.

The disclosure is advantageously implemented according to the aspects of the disclosure and the alternatives disclosed hereinafter, which are to be considered individually or according to any technically operative combination.

In an aspect of the disclosure, the intermediate washer is comprised of:

a peripheral key positioned on the peripheral portion of the intermediate washer, and a side key positioned on one of the side faces of the intermediate washer.

The peripheral key is positioned in the axial slot of the external ring. The intermediate washer makes it possible to create the relation between the rotation of the external ring and the rotation of the locking ring only in the locking phase.

In an aspect of the disclosure, said system comprises an elastic element suitable for displacing the locking piece along the longitudinal axis of the guide slot.

In an aspect of the disclosure, the elastic element is a spring positioned between the locking piece and the intermediate washer. The system comprises a return spring suitable for displacing the locking piece according to the longitudinal of the plug body.

In an aspect of the disclosure, an elastic washer is positioned between the plug body and the socket.

The elastic washer makes it possible to fill in the residual clearance of the locking. The residual clearance corresponds to the clearance resulting from the adjustments between the various parts. The elastic washer makes it possible to maintain the connectors in place and under pressure in order to not have any floating elements that can be degraded in a harsh environment.

In an aspect of the disclosure, the blocking tooth of the locking piece comprises an oblique slope. The oblique slope makes it possible to slide the locking piece and to compress the return spring at the moment of the passage of the lug of the socket.

In an aspect of the disclosure, the locking ring comprises a housing.

In an aspect of the disclosure, the side key of the intermediate washer is placed in the housing. The side key intervenes solely during the locking phase. The side key makes it possible to transmit the movement of rotation applied by the operator on the external ring to the locking ring without exerting any stress on the unblocking lug of the locking piece. This absence of stress allows the locking piece to freely return to the blocking position once the lug of the socket is in the circular part of the locking ramp and then generate an audible snap.

In an aspect of the disclosure, the unblocking ramp has a triangular shape.

The sloped portion of the unblocking ramp intervenes solely during the unlocking phase. The movement of rotation applied to the external ring displaces the sloped portion of the unblocking ramp in contact with the unblocking lug of the locking piece and thus drives the displacement of the locking piece in the guide slot by compressing the return spring. This displacement thus releases the lug of the socket which is in the circular part of the locking ramp of the locking ring.

The right portion and parallel to the axis of the external ring must be positioned at a distance from the unblocking lug all throughout the locking phase so that there is no friction that can slow down the return of the locking piece to the blocking position so as to generate the audible signal that indicates the perfect locking.

Finally, the right portion and perpendicular to the axis of the external ring must be positioned in such a way as to never intervene on the unblocking lug all throughout the locking and unlocking phases.

BRIEF DESCRIPTION OF THE DRAWINGS

Other advantages, purposes and characteristics of the present disclosure shall appear in light of the following detailed description, carried out based on the accompanying drawings, with an explanatory and in no way limiting purpose, the detailed description is to be read in relation with the accompanying drawings wherein:

FIG. 1 shows an exploded view of the bayonet-type locking system according to an aspect of the present disclosure, FIG. 2 shows the intermediate washer according to an aspect of the present disclosure, FIG. 3 shows on the left a view of the locking ring inserted into the external ring according to an aspect of the present disclosure. FIG. 3 shows on the right another view of the locking ring inserted into the external ring and a stripped view that shows the positioning of the peripheral key and of the side key of the intermediate washer according to an aspect of the present disclosure, FIG. 4 shows on the left, an exploded view and at the centre an assembled view that shows the positioning of the return spring and of the locking piece on the locking ring according to an aspect of the present disclosure. FIG. 4 shows on the right, a detail showing the oblique slope of the blocking tooth and the positioning of the blocking tooth that obstructs the locking ramp according to an aspect of the present disclosure.

DESCRIPTION

Figure 5:
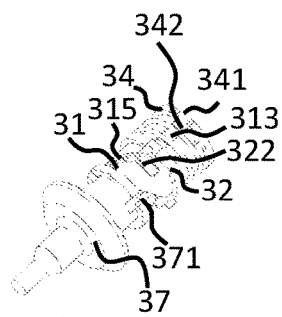
FIGS. 5 to 9 show the locking and blocking phases according to an aspect of the locking of the plug body to the socket.

FIG. 1 shows the socket 37, the lug 371, the elastic washer 36, the plug body 35, the external ring 30, the unblocking ramp 301, the locking ring 31, the locking piece 32, the return spring 33 and the intermediate washer 34, and the stop ring 38.

The socket 37 comprises on its external portion at least one lug of the socket 371 suitable for cooperating with the locking ring 31. In an aspect of the disclosure, the socket 37 comprises on its external portion three lugs 371. A plug body 35 is positioned inside the socket 37. The plug body 35 comprises several circular cylindrical portions of which the cylinder is more or less thick. On the plug body 35 is positioned an elastic washer 36 that makes it possible to fill in the residual clearance resulting from the locking. A locking ring 31 comes on top of the plug body 35 and a portion of the socket 37. The locking ring 31 makes it possible to connect and maintain together the plug body 35 to the socket 37. A locking piece 32, a return spring 33 and an intermediate washer 34 are suitable for cooperating with the locking ring 31. The external ring 30 surrounds the entire system, and comprises an unblocking ramp 301 suitable for cooperating with the locking piece 32.

FIG. 2 shows according to an aspect of the disclosure the intermediate washer 34 comprising a peripheral key 341 and a side key 342. The peripheral key 341 is located on the peripheral portion of the intermediate washer 34. The side key 342 is located on one of the faces of the intermediate washer 34.

The side key 342 is located on the peripheral key.

FIG. 3 shows on the left a view of the locking ring 31 inserted into the external ring 30 according to an aspect of the disclosure. The external ring 30 comprises on the internal face an axial slot 302 extending according to the longitudinal of the external ring 30. In the aspect shown, the internal face of the external ring 30 comprises three axial slots 302. These 3 axial slots 302 allow for the passage of the unblocking lugs 321 of the locking piece 32 during the assembly of the connector.

The external ring 30 is also comprised of an unblocking ramp 301 that has a sloped portion. The unblocking ramp 301 cooperates with the unblocking lug 321 of the locking piece 32. In the unlocking phase and when the external ring enters into rotation, the sloped portion of the unblocking ramp 301 exerts a pressure on the unblocking lug 321 of the locking piece 32. The displacement of the unblocking lug drives the sliding of the locking piece 32 that allows for the unblocking of the socket on the plug body. The blocking tooth of the locking piece makes it possible to block or not the lug 371 of the socket 37.

In an aspect of the disclosure, the external ring 30 is comprised of three unlocking ramps 301.

On the right of this figure is shown a zone in a dotted line that corresponds to a portion of the external ring 30 removed. This zone offers the possibility of viewing the positioning of the intermediate washer 34 wherein the peripheral key 341 is inserted into one of the axial slots 302. It also makes it possible to view the positioning of the side key 342 in the housing 311.

The locking ring 31 is contained inside the external ring 30. The external ring 30 has on the external face a knurled portion. In one of the alternatives, the entire external surface is knurled. The peripheral key 341 is housed in the axial slot 302.

A housing 311 is created in the locking ring 31 in order to receive the side key 342. During the setting into rotation of the external ring 30, the peripheral key 341 is driven in the axial slot 302 and the intermediate washer 34 enters in turn into rotation.

FIG. 4 on the left shows the positioning of the return spring and of the locking piece 32 on the locking ring 31. The locking ring 31 includes a locking ramp 313. In the aspect shown, the locking ring 31 includes three locking ramps 313.

Each locking ramp 313 is comprised of three successive parts, the axial part 314, the helical part 315 and, the circular part 316.

The term axial part means a linear shape passing through a parallel to the longitudinal. The term helical part means a helical shape rotating around an axis parallel to the longitudinal. The term circular part means a linear shape passing through a perpendicular to the longitudinal.

The locking ring 31 has two ends. One of the ends of the locking ring 31 comprises the end of the guide slot 312.

The other end of the locking ring 31 comprises the free end of the locking ramp 313; the free end of the locking ramp 313 is formed by the axial part 314 followed by the helical part 315 and ends in the middle of the material by the circular part 316.

The return spring 33 is positioned on the end of the locking ring 31 opposite the end of the locking ring 31 where the locking ramp 313 opens.

The locking piece 32 comprises an unblocking lug 321, and a blocking tooth 322 of the locking piece 32.

In this figure, at the centre, the locking piece 32 is placed around the locking ring 31 and comprises at least one blocking tooth 322.

In the aspect shown, the locking piece 32 comprises three blocking teeth. The blocking tooth 322 of the locking piece 32 comprises at least one guideway 323 suitable for cooperating in translation with the guide slot 312 of the locking ring 31.

The vertical part of the blocking tooth 322 makes it possible to prevent unlocking. The blocking tooth 322 of the locking piece 32 comprises also an oblique slope forming an angle of at least 35° with the vertical part of the blocking tooth.

In an aspect of the disclosure the angle formed by the vertical part and the oblique slope is 45°. The oblique slope of the blocking tooth of the locking piece 32 is suitable for cooperating with the lug 371 of the socket 37.

The return spring 33 is placed on the locking ring 31 next to the locking piece 32 of the side opposite the blocking tooth 322. When the pressure exerted on the return spring 33 is no longer effective, the return spring 33 quickly pushes back the locking piece 32 in its initial position and results in a representative audible noise that announces the locking.

In an aspect of the disclosure, the unblocking lug 321 is positioned on the blocking tooth 322 so as to benefit from the mechanical rigidity of said blocking teeth.

FIGS. 5 to 9 show different phases of an aspect of the locking of the plug body 35 to the socket 37. The locking is comprised of starting position of locking shown in FIG. 5, of several intermediate positions shown in FIGS. 6 to 8 and of a locked position shown in FIG. 9.

FIG. 5 shows the position of the start of the locking when the lug 371 of the socket 37 has just been engaged in the axial part 314 of the locking ramp 313 of the locking ring 31 until coming into contact with the helical part 315 of said locking ramp 313.

Figure 6:
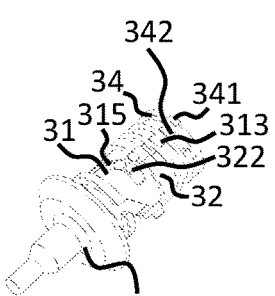

FIG. 6 shows on the intermediate positions when the lug 371 of the socket 37 is at the end of the helical part 315. The lug 371 of the socket 37 is in contact with the oblique slope of the blocking tooth 322. The blocking tooth 322 is at its initial position, in abutment with the locking ring due to the thrust of the return spring.

Figure 7:
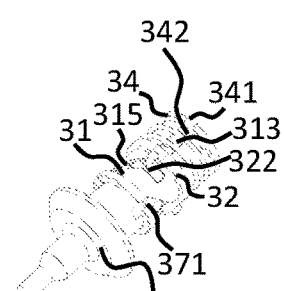

FIG. 7 shows one of the intermediate positions when the lug 371 of the socket 37 enters into relation with the oblique slope of the blocking tooth of the locking piece 32. When the lug 371 of the socket 37 enters into relation with the oblique slope of the blocking tooth 322 of the locking piece 32, the blocking tooth 322 is displaced in axial translation in the guide slot 312. The translation thus drives the axial deformation of the return spring 33.

Figure 8:
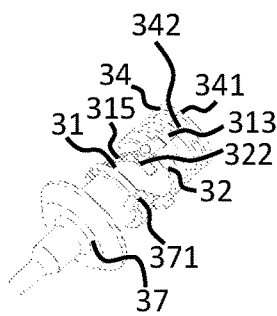

FIG. 8 shows another intermediate position. This position corresponds to the passage of the lug 371 of the socket 37 of the helical part 315 of the locking ramp 313 of the locking ring to the circular part 316 of the locking ramp 313 of the locking ring 31.

Figure 9:
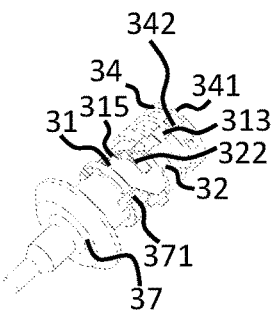

FIG. 9 shows the unlocking position wherein, the lug 371 of the socket 37 is in the circular part 316 of the locking ramp 313 of the locking ring 31. The blocking tooth 322 of the locking piece 32 has returned to its initial position in abutment in the locking ramp 313. The lug 371 of the socket 37 is blocked by the vertical part of the blocking tooth 322 in the circular part 316 of the locking ramp 313. The return spring 33 has also returned to its initial position. The returning of the return spring 33 to its initial position results in an impact between the blocking tooth 322 and the locking ramp 313 which generates a snapping noise that informs the operator that the locking is effective.

Figure 10:
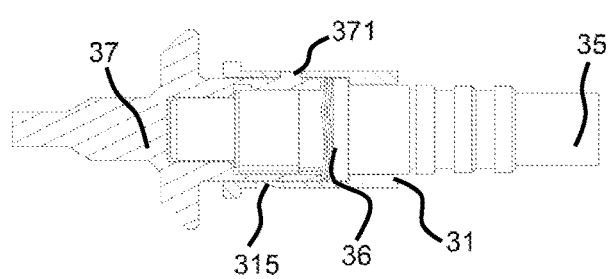
FIG. 10 shows a cross-section view according to a transversal profile of the plug body and of the socket, locked by the locking ring and maintained in position under pressure by the elastic washer according to an aspect of the present disclosure.

FIG. 10 shows the positioning of the plug body 35 in the socket 37, locked by the locking ring 31. The residual clearance resulting from the locking of the plug body 35 in the socket 37 by the locking ring is filled in by the elastic washer 36.

FIGS. 11 to 15 show an aspect of the unlocking of the plug body 35 from the socket 37 covered by the external ring 30 so as to view the interaction between the unblocking lug 321 and the unblocking ramp 301.

FIGS. 16 to 20 show an aspect of the unlocking of the plug body 35 from the socket 37 without the external ring in order to view the interactions between the lug 371 of the socket 37, the blocking tooth 322, the locking ramp 313, the intermediate washer (not visible but which follows the movement of the external ring) and the return spring 33.

Figure 11:
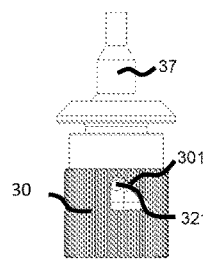
FIGS. 11 to 15 show an aspect of the unlocking of the plug body from the socket with the external ring.
Figure 13:
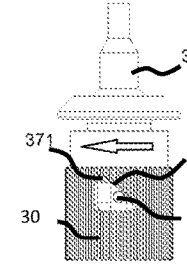
Figure 14:
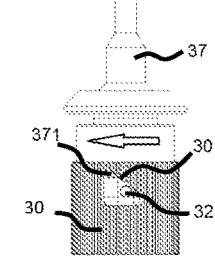
Figure 15:
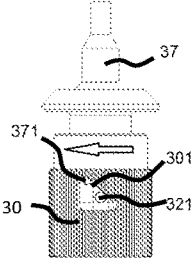
Figure 16:
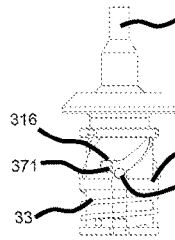
FIGS. 16 to 20 show an aspect of the unlocking of the plug body from the socket without the external ring.
Figure 18:
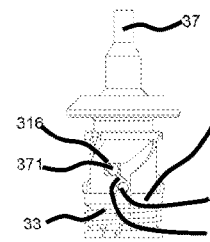
Figure 19:
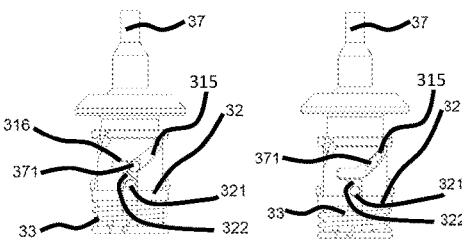
Figure 20:
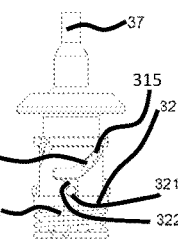

The unlocking is comprised of a locked position shown in FIGS. 11 and 16, several intermediate positions shown in FIGS. 12 to 14 and 17 to 19 and an unlocked position shown in FIGS. 15 and 20.

FIGS. 11 and 16 show the locking position wherein, the lug 371 of the socket 37 is in the circular part 316 of the locking ramp 313.

The blocking tooth 322 of the locking piece 32 is bearing in the locking ramp 313 under the pressure of the spring 33.

The lug 371 of the socket 37 is blocked in the circular part 316 of the locking ramp 313 by the vertical part of the blocking tooth 322. The return spring 33 is in its initial position.

Figure 12:
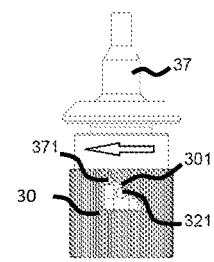
Figure 17:
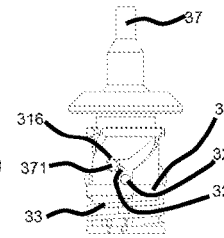

FIGS. 12 and 17 show one of the intermediate positions when the unblocking lug 321 of the locking piece 32 enters into relation with the unblocking ramp 301 of the external ring 30.

When the external ring enters into rotation and due to the contact between the lug 371 of the socket 37 and the blocking tooth 322, the sloped portion of the unblocking ramp 301 of the external ring 30 enters into relation with the unblocking lug 321 of the locking piece 32 driving the axial translation of the locking piece 32 into the guide slot 312 and the compression of the return spring 33.

FIGS. 13 and 18 show another of the intermediate positions where the return spring 33 continues to be compressed by the translation of the locking piece 32.

The torque applied on the external ring 30 in order to unlock the connectors, combined with the forces resulting from the contact between the unblocking lug 321 and the sloped portion of the unblocking ramp 301 generates an angular displacement of the locking ring 31 that maintains the lug 371 of the socket 37 in contact with the vertical part of the blocking tooth 321 of the locking piece 32. The lug 371 of the socket 37 is displaced in the circular part 316 of the locking ramp 313.

The lug 371 of the socket 37 is about to be released by the vertical part from the blocking tooth 322 of the locking piece 32.

FIGS. 14 and 19 show another of the unlocking positions when the lug 371 of the socket 37 translates from the circular part 316 to the helical part 315 of the locking ramp 313.

FIGS. 15 and 20 show the unlocking position when the lug 371 of the socket 37 continues to slide in the helical part 315 to the axial part 314 of the locking ramp 313 in order to obtain the complete unlocking of the connectors.

Decomposition of the Locking Phase after Approaching of the Two Connectors:

Rotation of the external ring
Rotation of the intermediate washer
Rotation of the locking ring
Conveyance of the lug of the socket in the axial part of the locking ramp
Conveyance of the lug of the socket in the helical part of the locking ramp
The lug of the socket comes into contact with the slope of the blocking tooth
Recoil in translation of the blocking tooth on the locking ring by guide slot/guideway connection
Compression of the return spring
Once there is sufficient room, translation of the lug of the socket to the circular part of the locking ramp
Return to the idle position of the blocking tooth when there is no longer any contact with the lug of the socket due to the thrust of the return spring
Generation of an audible signal.

Decomposition of the Unlocking Phase of the Two Connectors:

Rotation of the external ring
Putting the unblocking lug into contact with the unblocking ramp
Recoil of the unblocking lug on the slope of the unblocking ramp with compression of the return spring
Release of the lug of the socket
Rotation of the locking ring
Displacement of the lug of the socket to the helical part then axial part of the locking ramp
Disconnection
The locking piece returns to its idle place due to the thrust of the spring and the displacement of the lug of the socket The locking ring returns to its position in relation to the external ring dues to the exiting of the lug of the socket from the axial part of the locking ramp.

NOMENCLATURE

30 External ring
301 Unlocking ramp
302 Axial slot
31 Locking ring
311 Housing
312 Guide slot
313 Locking ramp
314 Axial part of the locking ramp
315 Helical part of the locking ramp
316 Circular part of the locking ramp
32 Locking piece
321 Unblocking lug
322 Blocking tooth
323 Guideway
33 Return spring
34 Intermediate washer
341 Peripheral key
342 Side key
35 Plug body
36 Elastic washer
37 Socket
371 Lug
38 Stop ring

What is claimed is:

1. A bayonet-type locking and unlocking system for a circular connector with audible indicator of locking comprising:
    a socket comprising at least one lug; and
    a plug body that is inserted into the socket;
    wherein said system comprises:
        an external ring comprising an axial slot on a lower wall of the external ring in which is inserted an intermediate washer driving the rotation thereof, said external ring comprises at least one unblocking ramp of which the slope is suitable for cooperating in an unlocking phase with an unblocking lug of a locking piece;
        a locking ring comprising at least one locking ramp in which a lug of the socket slides in translation, said locking ramp is comprised of three parts, an axial part, a helical part and a circular part;
        the lug of the socket slides successively during locking in the axial part, the helical part and the circular part of the locking ramp;
        the locking piece comprising at least one blocking tooth, and at least one guideway; said locking piece is mobile in axial translation with respect to the locking ring by the guideway and of a guide slot, the unblocking lug of the locking piece is suitable for cooperating with the unblocking ramp of the external ring in the unlocking phase only;
        said system comprises an unlocking position wherein the blocking tooth of the locking piece is positioned in the guide slot leaving the lug of the socket free to translate to the helical part of the locking ramp;
        said system comprises a locking position wherein the blocking tooth of the locking piece is positioned in the guide slot blocking the position of the lug of the socket in the circular part of the locking ramp; and
        said intermediate washer has a peripheral key linked in rotation by the axial slot of the external ring; said intermediate washer also has a side key linked in rotation by the a housing of the locking ring in the locking phase.

2. The system according to claim 1, wherein the intermediate washer is comprised of:
    the peripheral key positioned on the peripheral portion of the intermediate washer; and
    the side key positioned on one of the side faces of the intermediate washer.

3. The system according to claim 2, wherein the elastic element is a return spring positioned between the locking piece and the intermediate washer.

4. The system according to claim 2, wherein the side key of the intermediate washer is placed in the housing.

5. The system according to claim 1, wherein said system comprises an elastic element suitable for displacing the locking piece along the longitudinal axis of the guide slot.

6. The system according to claim 1, wherein an elastic washer is positioned between the plug body and the socket.

7. The system according to claim 1, wherein the blocking tooth of the locking piece comprises an oblique slope.

8. The system according to claim 1, wherein the locking ring comprises the housing.

* * * * *